United States Patent [19]
Kihara et al.

[11] Patent Number: 5,936,011
[45] Date of Patent: *Aug. 10, 1999

[54] MODIFIED POLYAMINE, AQUEOUS EPOXY RESIN CURING AGENT USING THE SAME AND PROCESS FOR PRODUCING THEREOF

[75] Inventors: Shuta Kihara; Shinichi Yonehama; Kichiro Seki, all of Hiratsuka, Japan

[73] Assignee: Mitsubishi Gas Chemical Company, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,226

[22] Filed: Apr. 30, 1996

[30] Foreign Application Priority Data

May 9, 1995 [JP] Japan ..................... 7-110611

[51] Int. Cl.$^6$ ..................... C08K 3/20
[52] U.S. Cl. .................... 523/404; 523/414; 528/111
[58] Field of Search ................... 523/404, 414; 528/111

[56] References Cited

U.S. PATENT DOCUMENTS

| | | | |
|---|---|---|---|
| 3,987,162 | 10/1976 | Scheuermann | 424/70 |
| 4,197,389 | 4/1980 | Becker et al. | 528/103 |
| 4,423,170 | 12/1983 | Waddill | 523/417 |
| 5,019,606 | 5/1991 | Marten et al. | 523/414 |
| 5,034,434 | 7/1991 | Beresford et al. | 525/533 |
| 5,604,269 | 2/1997 | Papalos et al. | 523/404 |

FOREIGN PATENT DOCUMENTS

| | | |
|---|---|---|
| 709 418 | 5/1996 | European Pat. Off. . |
| 42 44 194 | 6/1994 | Germany . |
| 6-179801 | 6/1994 | Japan . |
| 1 259 692 | 1/1972 | United Kingdom . |
| WO 93 12187 | 6/1993 | WIPO . |

OTHER PUBLICATIONS

Database WPI, XP–002060912, Abstract of JP 6–179,801, Jun. 28, 1994.

Chemical Abstracts No. 141696n, vol. 76, No. 24, Jun. 12, 1972, Columbus, Ohio, P–002060911.

*Primary Examiner*—Randy Gulakowski
*Attorney, Agent, or Firm*—Armstrong, Westerman, Hattori, McLeland & Naughton

[57] ABSTRACT

Provided are a modified polyamine which comprises a reaction product between a polyamine and a chlorohydrin synthesized by the reaction of a polyoxyalkylene polyether with an epichlorohydrine and having a total chlorine content of 1,000 ppm or below, and an aqueous epoxy resin curing agent using the same.

2 Claims, No Drawings

MODIFIED POLYAMINE, AQUEOUS EPOXY RESIN CURING AGENT USING THE SAME AND PROCESS FOR PRODUCING THEREOF

BACKGROUND OF THE INVENTION

1) Field of the Invention

The present invention relates to a modified polyamine, an aqueous epoxy resin curing agent using the same and processes for producing thereof. Aqueous epoxy resin curing agents are widely used in industrial fields such as coatings being used for the purpose of anticorrosion or decoration, adhesives for civil and building work and the like.

2) Prior Art

Epoxy resins have been widely used in the above-mentioned industrial fields by virtue of many more excellent charateristics including adhesive property, heat resistance, chemical resistance, electrical properties, mechanical properties, etc., for various substrates than those of other types of resins. Generally, the form of epoxy resin composition being used in the field of coating and adhesive is classified broadly into a liquid type containing no solvent (solventless type), a liquid type containing an organic solvent as main medium (organic solvent type), a liquid type containing water as medium (aqueous composition) and solid (powder) type (powder composition).

Among the above-mentioned types, the solventless type is a composition wherein its viscosity has been lowered by adding a low-viscosity curing agent and a high boiling point diluent to an epoxy resin in the form of liquid at ordinary temperature. However, it is inevitable that, in the course of producing a low-viscosity curing agent, a large amount of free amines and phenols harmful to the human body has to be used, and even in case of a diluent doing comparatively small harm to human body, the use of such diluent causes deterioration in the performance of a curing agent.

In the organic solvent type, a high molecular weight epoxy resin in the form of solid at ordinary temperature is generally dissolved in a low-viscosity solvent such as xylene, toluene, cellosolve, ethanol, n-butanol, etc., and the range of curing agent which can be selected is wide. Accordingly, the organic solvent type not only affords a high-performance cured product, but also permits optional adjustment of viscosity of the composition, and thus is often used for the above-mentioned purpose. Nevertheless, regulation for use of solvent has been become stringent year by year due to problems including harmfulness to workers handling such organic solvents, such hazard as fire or explosion and environmental pollution such as air pollution.

The powder type composition, which is mainly used as a coating, is a combination of a solid epoxy resin with a solid curing agent, but use thereof is limited with regard to its workability.

The aqueous type composition is obtained by dispersing or dissolving an epoxy resin and a curing agent in water and is a composition with excellent workability free from the above-mentioned drawbacks which are inherent in other types of compositions except properties of cured product.

Conventional aqueous epoxy resin compositions had the disadvantage that an emulsifier using for formation of a stable emulsion exerted bad influence on properties of cured epoxy product. U.S. Pat. No. 4,197,389 and Japanese Patent Application Laid-Open No. 6-179801 each disclose a curing agent having a self-emulsifiable property. Since in the former a catalyst being used in synthesis is mixed in a curing agent and in the latter aliphatic diglycidyl ether having a comparatively high chlorine content is generally used, products using such curing agents had disadvantages that properties of the cured products, particularly water resistance, were inferior.

SUMMARY OF THE INVENTION

An object of the present invention is to provide an amine epoxy resin curing agent being suitably used for coating and adhesive and using water as a medium, which has good dispersibility for water and excellent properties of cured product, particularly water resistance and furthermore eliminates the disadvantages described above in Prior Art, i.e., problems including harmfulness to human body being caused by using organic solvents, such hazard as fire or explosion and environmemtal pollution, and a modified polyamine being used in the same and processes for producing thereof.

As a result of extensive studies to solve the above-mentioned subjects, the present inventors have found that a modified polyamine having a low chlorine content can be obtained by reacting in the presence of an alkali a polyamine with a halohydrin being obtained by the reaction between a polyoxyalkylene polyether and an epichlorohydrin in the presence of an acidic catalyst and furthermore an aqueous epoxy resin curing agent being obtained by adduct reacting the above-mentioned modified polyamine thus obtained with a hydrophobic epoxy compound can easily emulsify an epoxy resin and properties of a cured product being obtained therefrom are superior to those of conventional aqueous epoxy resin compositions, and have established the present invention.

That is, the present invention provides a modified polyamine which comprises a reaction product between a polyamine and a chlorohydrin synthesized by the reaction of a polyoxyalkylene polyether represented by the following general formula (1):

$$RO\text{---}(XO)_n\text{---}H \qquad (1)$$

wherein R represents a hydrogen atom or a hydrocarbon group having 1 to 20 carbon atoms, X represents an alkyl group having 2 to 4 carbon atoms and n is an integer of 1 to 30, with an epichlorohydrin, and having a total chlorine content of 1,000 ppm or below.

The present invention provides an aqueous epoxy resin curing agent which comprises a reaction product between a (a) modified polyamine comprising a reaction product between a polyamine and a chlorohydrin synthesized by the reaction of a polyoxyalkylene polyether being represented by the following general formula (1):

$$RO\text{---}(XO)_n\text{---}H \qquad (1)$$

wherein R represents a hydrogen atom or a hydrocarbon group having 1 to 20 carbon atoms, X represents an alkyl group having 2 to 4 carbon atoms and n is an integer of 1 to 30, with an epichlorohydrin, and having a total chlorine content of 1,000 ppm or below, and at least one kind of (b) hydrophobic epoxy compound having at least one epoxy group in the molecule, and having a total chlorine content of 500 ppm or below.

The present invention provides an aqueous epoxy resin curing agent which comprises a reaction product of a (a) modified polyamine comprising a reaction product between a polyamine and a chlorohydrin synthesized by the reaction of a polyoxyalkylene polyether being represented by the following general formula (1):

RO—(XO)$_n$—H        (1)

wherein R represents a hydrogen atom or a hydrocarbon group having 1 to 20 carbon atoms, X represents an alkyl group having 2 to 4 carbon atoms and n is an integer of 1 to 30, with an epichlorohydrin, and having a total chlorine content of 1,000 ppm or below, at least one kind of (b) hydrophobic epoxy compound having at least one epoxy group in the molecule, and an (c) unsaturated compound with addition reacting ability being represented by the following general formula (2):

R$^1$—CH=CR$^2$—Y        (2)

wherein R$^1$ represents H, CH$_3$ or C$_2$H$_5$, R$^2$ represents H or CH$_3$, Y represents CN, COOH, COONH$_2$ or COOR$^3$ and R$^3$ represents an alkyl group of 1 to 4 carbon atoms, and having a chlorine content of 500 ppm or below.

The present invention provides a process for producing a modified polyamine which comprises reacting a polyamine with a chlorohydrin synthesized by the reaction of a polyoxyalkylene polyether being represented by the following general formula (1):

RO—(XO)$_n$—H        (1)

wherein R represents a hydrogen atom or a hydrocarbon group having 1 to 20 carbon atoms, X represents an alkyl group having 2 to 4 carbon atoms and n is an integer of 1 to 30, with an epichlorohydrin, and thereby producing a modified polyamine having a total chlorine content of 1,000 ppm or below.

The present invention provides a process for producing an aqueous epoxy resin curing agent which comprises reacting a (a) modified polyamine comprising a reaction product between a polyamine and a chlorohydrin synthesized by the reaction of a polyoxyalkylene polyether being represented by the following general formula (1):

RO—(XO)$_n$—H        (1)

wherein R represents a hydrogen atom or a hydrocarbon group having 1 to 20 carbon atoms, X represents an alkyl group having 2 to 4 carbon atoms and n is an integer of 1 to 30, with an epichlorohydrin, and having a total chlorine content of 1,000 ppm or below, with at least one kind of (b) hydrophobic epoxy compound having at least one epoxy group in the molecule, and thereby producing an aqueous epoxy resin curing agent having a total chlorine content of 500 ppm or below.

The present invention provides a process for producing an aqueous epoxy resin curing agent which comprises reacting a (a) modified polyamine comprising a reaction product between a polyamine and a chlorohydrin synthesized by the reaction of a polyoxyalkylene polyether being represented by the following general formula (1):

RO—(XO)$_n$—H        (1)

wherein R represents a hydrogen atom or a hydrocarbon group having 1 to 20 carbon atoms, X represents an alkyl group having 2 to 4 carbon atoms and n is an integer of 1 to 30, with an epichlorohydrin, and having a total chlorine content of 1,000 ppm or below, with at least one kind of (b) hydrophobic epoxy compound having at least one epoxy group in the molecule, and an (c) unsaturated compound with addition reacting ability being represented by the following general formula (2):

R$^1$—CH=CR$^2$—Y        (2)

wherein R$^1$ represents H, CH$_3$ or C$_2$H$_5$, R$^2$ represents H or CH$_3$, Y represents CN, COOH, COONH$_2$ or COOR$^3$ and R$^3$ represents an alkyl group of 1 to 4 carbon atoms, and thereby producing an aqueous epoxy resin curing agent having a chlorine content of 500 ppm or below.

DETAILED DESCRIPTION OF THE INVENTION

The present invention will be described in detail below.

It is preferable to produce the modified polyamine of the present invention according to the following two steps.

(I) step for synthesizing a chlorohydrin by reacting a polyoxyalkylene polyether being represented by the above-mentioned general formula (1) with an epichlorohydrin in a molar ratio of 1 to 10 mole of epichlorohydrin to 1 mole of hydroxyl group of polyoxyalkylene polyether in the presence of an acidic catalyst.

(II) step for synthesizing a modified polyamine by reacting a chlorohydrin obtained in the step (I) with a polyamine in a molar ratio of 0.5 to 100 mole of polyamine to 1 mole of epichlorohydrin using in the synthesis of chlorohydrine in the presence of an alkali.

Further, it is preferable to produce the aqueous epoxy resin curing agent of the present invention according to the following two methods.

(A) method for reacting a (a) modified polyamine obtained in the step (II) with at least one kind of (b) hydrophobic epoxy compound having at least one epoxy group in the molecule in a ratio of 0.2 to 0.5 equivalent of epoxy group per 1 mole of hydrogen atom bonded to nitrogen atom capable of reacting with epoxy group of the modified polyamine.

(B) method for reacting a (a) modified polyamine obtained in the step (II) with at least one kind of (b) hydrophobic epoxy compound having at least one epoxy group in the molecule and an (c) unsaturated compound with addition reacting ability being represented by the above-mentioned general formula (2) in a ratio of 0.2 to 0.5 equivalent of the sum total of epoxy group and unsaturated group per 1 mole of hydrogen atom bonded to nitrogen atom capable of reacting with epoxy group or unsaturated group.

The polyoxyalkylene polyethers being represented by general formula (1) being used in the step (I) include polyethers being produced by block- or random-addition reaction of monohydric alcohols having 1 to 20 carbon atoms including methanol, 2-ethylhexyl alcohol, stearyl alcohol, etc., monohydric phenols having 1 to 20 carbon atoms including phenol, butyl phenol, nonyl phenol, etc., glycols including ethylene glycol, propylene glycol, etc., or dihydric phenols including bisphenol A, bisphenol F, etc., with 1 to 30 mole of alkylene oxide having 2 to 4 carbon atoms including ethylene oxide, propylene oxide, etc., and examples thereof include polyethylene glycol, polyethylene glycol monomethylether, polyethylene glycol nonylphenolether, polypropylene glycol, polypropylene glycol monobutylether and the like, and furthermore polyethers being produced by block- or random-addition reaction of the above-mentioned monohydric alcohols, monohydric phenols, glycols or dihydric phenols with 1 to 30 mole of alkylene oxide having 2 to 4 carbon atoms including ethylene oxide or propylene oxide, etc., among which polyethylene glycols/polypropylene glycols copolymers and the like are included.

Emulsifiability of the curing agent can be improved by using a combination of at least two species of polyoxyalkylene polyetheres having a different molecular weight from each other.

The reaction ratio of epichlorohydrin to polyoxyalkylene ether in the step (I) is in a molar ratio of 1 mole or above of epichlorohydrin to 1 mole of hydroxyl group of polyoxyalkylene ether and preferably in a molar ratio of 1 to 10. When the molar ratio is below 1, unreacted polyoxyalkylene ether remains in a curing agent, so that properties of cured product deteriorate. When the reaction is conducted in a molar ratio of 1 or above, unreacted epichlorohydrin may be in a state remained in the reaction mixture after completion of the reaction, though it is possible to recover it by distillation. Further, when the reaction is conducted in a molar ratio of 1 or above, a chlorohydrin being produced by the reaction of a polyoxyalkylene polyether with an epichlorohydrin may further react with an epichlorohydrin.

Examples of the acidic catalyst to promote the reaction of a polyoxyalkylene polyether with an epichlorohydrin in the step (I) include Lewis acids such as boron trifluoride, aluminum chloride, zinc chloride, iron chloride, etc., and complexes thereof, among which boron trifluoride compounds are preferable and particularly boron trifluoride/ ether complex is more preferable.

The amount of the catalyst is in the range of 0.0001 to 0.1 mole and preferably in the range of 0.001 to 0.05 mole per 1 mole of hydroxyl group of polyoxyalkylene polyether. When the amount is below 0.0001 mole, catalytic effects are poor, whereas above 0.1 mole unpreferable side reactions easily occur.

The above-mentioned reaction is conducted at a reaction temperature of 0 to 180° C. and preferably 20 to 90° C. When the reaction temperature is too low, the reaction does not progress, whereas too high side reactions easily occur.

Examples of the polyamines being used in the step (II) include ethylenediamine, diethylenetriamine, triethylenetetramine, hexamethylenediamine, metaxylylenediamine, paraxylylenediamine, aliphatic polyamines including polyoxyalkylene polyamines, etc., alicyclic polyamines including 1,3-bis(aminomethyl) cyclohexylamine (1,3-BAC), isophoronediamine, 1,4-diaminocyclohexane, di(aminocyclohexyl)methane, etc., aromatic polyamines including methaphenylenediamine, methylenedianiline (DDM), diaminodiphenylsulfone, etc., heterocyclic polyamines including N-aminoethylpiperazine, 3,9-bis(3-aminopropyl) 2,4,8,10-tetraoxaspiro(5,5) undecane, etc and the like. Among them, diethylenetriamine, triethylenetetramine, metaxylylenediamine, 1,3-bis (aminomethyl)cyclohexylamine(1,3-BAC), isophoronediamine and methylenedianiline being used for conventional solvent type or solventless type epoxy resin curing agents are particularly preferable, and metaxylylenediamine and 1,3-bis(aminomethyl)cyclohexylamine(1,3-BAC) as a derivative thereof are most suitably used.

The above-mentioned polyamines are used alone or in a mixture of at least two species.

The reaction ratio of polyamine to chlorohydrin in the step (II) is in a molar ratio of 0.5 to 100 mole, preferably 1 to 20 mole of polyamine to 1 mole of epichlorohydrin using in the synthesis of chlorohydrin (except recovered epichlorohydrin wherein unreacted epichlorohydrin has been recovered by distillation, etc., after completion of the reaction). When the molar ratio is too high, emulisifiable property of curing agent being obtained is insufficient, whereas too low, properties of epoxy resin cured product prepared by using a curing agent being obtained deteriorate.

Examples of the alkali compound being used in the reaction of epichlorohydrin with polyamine in the step (II) include alkali metal hydroxides, etc., and preferably sodium hydroxide and potassium hydroxide.

The amount of alkali is 1 to 4 equivalent, preferably 1 to 2 equivalent per 1 mole of epichlorohydrin using in the synthesis of chlorohydrin (except recovered epichlorohydrin wherein unreacted epichlorohydrin has been recovered by distillation, etc., after completion of the reaction). When the amount of alkali is small, the removal of chlorine is insufficient, whereas above 4 equivalent it is economically disadvantageous.

The alkali compound may be used in the form of solid or aqueous solution. The form of aqueous solution is preferable from the viewpoint of easiness of handling. In an aqueous solution, it is desirable that an alkali concentration thereof is higher. An alkali concentration of 25 to 50% by weight is preferable.

The reaction of chlorohydrin with polyamine in the step (II) may be conducted by adding dropwise an alkali to a mixture of chlorohydrin with polyamine, adding divisionally a solid alkali to the above-mentioned mixture or adding dropwise chlorohydrin to a mixture of polyamine with alkali compound.

The reaction temperature is a temperature of 0 to 100° C., and preferably a temperature of 30 to 80° C. When the reaction temperature is too low, the reaction progresses too slowly, whereas too high, side reactions readily occur.

In the reaction of chlorohydrin with polyamine in the step (II), unreacted epichlorohydrin being contained in chlorohydrin reacts with polyamine under the same conditions as in the reaction of chlorohydrin with polyamine, thereby by-producing a chlorohydrin/polyamine condensate. The by-product also is a polyamine compound, which may remain in the product or may further react with chlorohydrin.

In the reaction of chlorohydrin with polyamine in the step (II), a solvent may be used together, if necessary. Examples of preferable solvent include hydrocarbons including n-hexane, cyclohexane, n-heptane, benzene, toluene, etc., and ethers including ethylether, isopropylether, etc.

In order to isolate a modified polyamine produced in the step (II), for example, produced water is distilled off by distillation and then by-produced alkali chloride and excess alkali may be separated by filtration, etc., or by-produced alkali chloride and excess alkali are removed with water washing of reaction mixture and then water and/or solvent may be distilled off by distillation.

According to the above-mentioned steps (I) and (II), a very high purity of a modified polyamine having a total chlorine content of 1,000 ppm or below, usually 500 ppm or below is obtained.

The (b) hydrophobic compound being used in the methods (A) and (B) for the production of epoxy resin curing agent of the present invention is at least one kind of epoxy compound having at least one epoxy group in the molecule and examples thereof include glycidyl ethers of monohydric or polyhydric alcohol, glycidyl ethers of monohydric or polyhydric phenol, glycidyl ethers of monobasic or polybasic carboxylic acid and the like.

Examples of glycidyl ethers of monohydric and polyhydric alcohol include butyl glycidyl ether, 2-ethylhexyl glycidyl ether, decyl glycidyl ether, dodecyl glycidyl ether, stearyl glycidyl ether and the like.

Examples of glycidyl ethers of monohydric phenol include phenyl glycidyl ether, tert-butylphenyl glycidyl ether, sec-butylphenyl glycidyl ether and the like.

Examples of glycidyl ethers of polyhydric alcohol include glycerol diglycidyl ether, polypropylene glycol diglycidyl ether, neopentylglycol diglycidyl ether, trimethylolpropane triglycidyl ether and the like.

Examples of glycidyl ethers of polyhydric phenol include epoxy resin of so called bisphenol A type which is obtained by the reaction of bisphenol A with epichlorohydrin, epoxy resin of so called bisphenol F type which is obtained by the reaction of bisphenol F with epichlorohydrin and epoxy resin of so called phenol/novolac type which is obtained by the reaction of phenol/formaldehyde condensate with epichlorohydrin and the like.

Examples of glycidyl esters of monobasic or polybasic carboxylic acid include polyglycidyl ester of terephthalic acid, hexahydrophthalic acid, maleic acid, fumaric acid, itaconic acid, succinic acid, adipic acid, sebacic acid, dimer acid, trimellitic acid, pyromellitic acid, etc.

The preferable species among the above-exemplified hydrophobic epoxy compound include butyl glycidyl ether, 2-ethylhexyl glycidyl ether, tertbutylphenyl glycidyl ether, sec-butylphenyl glycidyl ether, polypropyleneglycol diglycidyl ether, epoxy resin of bisphenol A type, epoxy resin of bisphenol F type, epoxy resin of phenol/novolac type and Carjuler E (trademark of a product by Yuka Shell Epoxy Co., Ltd.) and the like.

The above-exemplified species may be used alone or in a combination with at least one other species.

Examples of (c) unsaturated compound with addition reacting ability being used in the method (B) include acrylonitrile, acrylic acid, methyl methacrylate, methacrylic amide, etc., among which acrylonitrile is preferable.

In the reaction of (a) modified polyamine, (b) hydrophobic epoxy resin and (c) unsaturated compound in the methods (A) and (B), a polyamine may be used together. Examples of polyamine being used in such case includes aliphatic polyamines including ethylenediamine, diethylenetriamine, triethylenetetramine, hexamethylenediamine, methaxylylenediamine, paraxylylenediamine, polyoxyalkylene polyamines, etc., alicyclic polyamines including 1,3-bis(aminomethyl) cyclohexylamine (1,3-BAC), isophoronediamine, 1,4-diaminocyclohexane, di(aminocyclohexyl)methane, etc., ; aromatic polyamines including metaphenylenediamine, methylenedianiline (DDM), diaminodiphenylsulfone, etc., ; heterocyclic polyamines including N-aminoethylpiperazine, 3,9-bis(3-aminopropyl)2, 4, 8, 10-tetraoxaspiro(5,5) undecane, etc.

Particularly preferable species among them include diethylenetriamine, triethylenetetramine, metaxylylenediamine, 1,3-bis(aminomethyl) cyclohexylamine (1,3-BAC), isophoronediamine and methylenedianiline(DDM) being used for conventional epoxy resin curing agent of solvent type or solventless type.

The above-mentioned polyamine may be used alone or as a mixture of at least two polyamines.

Regarding the reaction ratio of (a) modified polyamine, (b) hydrophobic epoxy resin and (c) unsaturated compound, a ratio of 0.2 to 0.5 equivalent of the sum total of epoxy group and unsaturated group per 1 mol of hydrogen atom of modified polyamine bonded to nitrogen atom capable of reacting with epoxy group or saturated group is preferable. When the ratio is below 0.2 equivalent, emulsifiability of curing agent being obtained deteriorates, whereas above 0.5 equivalent properties of cured product being obtained deteriorate.

The conditions of the reaction between (a) modified polyamine and (b) hydrophobic epoxy compound in the method (A) include a reaction temperature of 80 to 120° C. and a reaction time of 1 to 3 hours. When at least one kind of epoxy resin is used, the epoxy compound may be added dropwise to a reaction vessel simultaneously together or separately thereto.

The condition of the reaction between (a) modified polyamine and (c) unsaturated compound in the method (B) include a reaction temperature of 80 to 120° C. and a reaction time of 1 to 3 hours. The reaction may be effected before or after the reaction of (a) modified polyamine with (b) epoxy compound.

According to the above-mentioned methods (A) and (B), an aqueous epoxy resin curing agent having a chlorine content of 500 ppm or below, usually 100 ppm or below is obtained.

Examples of the epoxy resin to be used for preparing an epoxy resin cured product by the use of aqueous epoxy resin curing agent of the present invention, include epoxy resin of bisphenol A type which is obtained by the reaction of bisphenol A with epichlorohydrin, epoxy resin of bisphenol F type which is obtained by the reaction of bisphenol F with epichlorohydrin, epoxy resin of bisphenol AD type which is obtained by the reaction of bisphenol AD with epichlorohydrin and epoxy resin of so called phenol/novolac type which is obtained by the reaction of phenol/formaldehyde condensate with epichlorohydrin.

In the case of producing an aqueous epoxy resin cured product, there is usually used an emulsion-type epoxy resin by using an emulsifier or self-emulsifiable modified epoxy resin. However, in the case of using the aqueous self-emulsifiable epoxy resin curing agent according to the present invention, an epoxy resin in liquid form is used as well.

The mixture of the aqueous epoxy resin curing agent according to the present invention with the above-mentioned epoxy resin are easily emulsified by adding water, thus dispensing with such equipment as a high rotational speed homomixer. When necessary, however, an organic solvent which is generally used in coating materials may coexist with the epoxy resin.

Moreover, the aqueous self-emulsifiable epoxy resin curing agent according to the present invention and the cured product from the epoxy resin may optionally be incorporated with a known pigment and filler such as calcium carbonate, talc, etc., a levelling agent, antifoaming agent or the like.

PREFERRED EMBODIMENT OF THE INVENTION

The present invention will be described in more detail, referring to Examples, which are not intended to limit of the present invention.

PREPARATION EXAMPLE 1

(Production of Modified Polyamine)

In a 2 l reaction vessel equipped with an agitator, a thermometer, a tube for feeding nitrogen, a dropping funnel and a condenser were fed 508 g (0.5 mol) methoxypolyethylene glycol (1016 molecular weight, produced by NOF Corporation, the trademark "Uniox M-1000) and 0.78 g of $BF_3$/diethylether complex, and then 50.9 g (0.55 mol) of epichlorohydrin was added dropwise thereto at 45° C. under stirring over one hour. After the completion of the dropwise addition, the reaction was carried out for 2 hours at a reaction temperature raised to 50° C. The vessel interior was cooled to 35° C. and then 544 g (4.0 mol) of metaxylylenediamine was added thereto. Then, 56.2 g (0.56 mol) of 40% aqueous solution of sodium hydroxide was added dropwise thereto over one hour at 35° C.

After the completion of the dropwise addition, the reaction was again carried out for one hour at a reaction temperature raised to 60° C. After the completion of the reaction, water was distilled away at 80 to 100° C. under a reduced pressure of 100 mmHg. Thereafter, sodium chloride which precipitated in the residue in the still was filtered off. Thereby, 960.4 g of modified polyamine having a total chlorine content of 390 ppm was obtained.

PREPARATION EXAMPLE 2

In the same reaction vessel as that used in Preparation Example 1 were fed 500 g (0.5 mol) of polyethylene glycol (1000 molecular weight, produced by Wako Junyaku K.K., reagent of first grade and 1.02 g of $BF_3$/ether complex, and then 92.5 g (1.0 mol) of epichlorohydrin was added dropwise thereto at 50° C. under stirring over one hour. After the completion of the dropwise addition, the reaction was carried out for 2 hours at a reaction temperature raised to 60° C. The vessel interior was cooled to 35° C. and then 544 g (4.0 mol) of mextaxylylenediamine was added thereto. Then, 112.4 g (1.12 mol) of 40% aqueous solution of sodium hydroxide was added dropwise thereto over one hour at 35° C. After the completion of the dropwise addition, the reaction was again carried out for one hour at a reaction temperature raised to 60° C.

After the completion of the reaction, water was distilled away at 80 to 100° C. under a reduced pressure of 100 mmHg. Thereafter, sodium chloride which precipitated in the residue in the still was filtered off. Thereby, 976.5 g of modified polyamine having a total chlorine content of 440 ppm was obtained.

PREPARATION EXAMPLE 3

In a 2 l reaction vessel equipped with an agitator, a thermometer, a tube for feeding nitrogen, a dropping funnel and a condenser were fed 1016 g (1.0 mol) of methoxypolyethylene glycol (1016 molecular weight, produced by NOF Corporation, the trademark "Uniox M-1000") and 1.5 g of $BF_3$/ether complex, and then 101.8 g (1.1 mol) of epichlorohydirn was added dropwise thereto at 45° C. under stirring over one hour. After the completion of dropwise addition, the reaction was carried out for 2 hours at a reaction temperature raised to 50° C. Then, 112.4 g (1.12 mol) of 40% aqueous solution of sodium hydroxide was added dropwise thereto over one hour. After the completion of the dropwise addition, the reaction was again carried out for one hour at a reaction temperature raised to 80° C.

After the completion of the reaction, water was distilled away at 80 to 100° C. under a reduced pressure of 100 mmHg. Thereafter, sodium chloride which precipitated in the residue in the still was filtered off. Thereby, epoxy equivalent 1096 (g/equivalent) of metoxypolyethyleneglycol glycidyl ether having a total chlorine content of 8400 ppm was obtained.

EXAMPLE 1

(Production of Curing Agent)

In a 2 l reaction vessel equipped with an agitator, a thermometer, a tube for feeding nitrogen, a dropping funnel and a condenser were fed 270 g of the modified polyamine synthesized in Production Example 1 (corresponding to the modified polyamine based on 1 mol of metaxylene, 0.125 mol of methoxypolyethylene glycol and 0.14 mol of epichlorohydrin) and 117 g (0.86 mol) of metaxylylenediamine, and then a mixture of 177 g (0.466 mol) of epoxy resin in liquid form of bisphenol A type (epoxy equivalent of 190, produced by Yuka Shell Epoxy Co., Ltd., the trademark "Epicoat 828") with 344 g (2.6 mol) of butyl glycidyl ether (epoxy equivalent of 132, produced by NOF Corporation, the trademark "Epiol B") was added dropwise thereto over one hour at 80° C. in an atmosphere of nitrogen under stirring.

After the completion of the dropwise addition, the reaction was carried out for one hour at a reaction temperature raised to 100° C. Then, the vessel interior was cooled to 60° C. The reaction product thus obtained was diluted with water to a solid concentration of 94% by weight. Thereby, a curing agent with an active hydrogen equivalent of 255 was obtained.

EXAMPLE 2

In the same reaction vessel as in Example 1 was fed 270 g of the modified polyamine synthesized in Production Example 1 (corresponding to the modified polyamine based on 1 mol of metaxylene, 0.125 mol of methoxypolyethylene glycol and 0.14 mol of epichlorohydrin), and then 186 g (1 mol) of 2-ethylehexyl glycidyl ether (epoxy equivalent of 186, produced by NOF Corporation, the trademark "Epiol EH") was added dropwise thereto over one hour at 80° C. in an atmosphere of nitrogen under stirring. After the completion of the dropwise addition, the reaction was carried out for one hour at a reaction temperature raised 100° C. Then, the vessel interior was cooled to 80° C., and then 231 g (1.70 mol) of metaxylylenediamine was added thereto. Then, a mixture of 307 g (0.807 mol) of epoxy resin in a liquid form of bisphenol A type (epoxy equivalent 190, produced by Yuka Shell Epoxy Co., Ltd., the trademark "Epicoat 828) with 278 g (2.1 mol) of butyl glycidyl ether (epoxy equivalent of 132, produced by NOF Corporation, the tradmark "Epiol B") was added dropwise thereto over one hour at 80° C.

After the completion of the dropwise addition, the reaction was again carried out for one hour at a reaction temperature raised to 100° C. Then, the vessel interior was cooled to 60° C. The reaction product thus obtained was diluted with water to a solid concentration of 94% by weight. Thereby, a curing agent with an active hydrogen equivalent of 226 was obtained.

EXAMPLE 3

In the same reaction vessel as in Example 1 was fed 275 g of the modified polyamine synthesized in Production Example 2 (corresponding to the modified polyamine based on 1 mol of metaxylene, 0.125 mol of polyethylene glycol, and 0.28 mol of epichlorohydrin), and then 163 g (0.88 mol) of 2-ethylhexyl glycidyl ether (epoxy equivalent of 186, produced by NOF Corporation, the trademark "Epiol EH") was added dropwise thereto over one hour at 80° C. in an atmosphere of nitrogen under stirring. After the completion of the dropwise addition, the reaction was carried out for one hour at a reaction temperature raised 100° C. Then, the vessel interior was cooled to 80° C., and then 200 g (1.47 mol) of metaxylylenediamine was added thereto. Then, a mixture of 282 g (0.743 mol) of epoxy resin in a liquid form of bisphenol A type (epoxy equivalent 190, produced by Yuka Shell Epoxy Co., Ltd., the trademark "Epicoat 828")

with 236 g (1.79 mol) of butyl glycidyl ether (epoxy equivalent of 132, produced by NOF Corporation, the trademark Epiol B") was added dropwise thereto over one hour at 80° C.

After the completion of the dropwise addition, the reaction was again carried out for one hour at a reaction temperature raised to 100° C. Then, the vessel interior was cooled to 60° C. The reaction product thus obtained was diluted with water to a solid concentration of 94% by weight. Thereby, a curing agent with an active hydrogen equivalent of 224 was obtained.

COMPARATIVE EXAMPLE 1

In the same reaction vessel as in Example 1 was fed 544 g (4.0 mol) of metaxylylenediamine, and then a mixture of 293 g (0.267 mol) methoxypolyethyleneglycol glycidyl ether synthesized in Production Example 3, 380 g (1.0 mol) of epoxy resin in a liquid form of bisphenol A type (epoxy equivalent of 190, produced by Yuka Shell Epoxy Co., Ltd., the trademark "Epicoat 828")and 739 g (5.6 mol) of butyl glycidyl ether (epoxy equivalent of 132, produced by NOF Corporation, the trademark "Epiol B") was added dropwise thereto over one hour at 80° C. in an atmosphere of nitrogen under stirring. After the completion of the dropwise addition, the reaction was carried out for one hour at a reaction temperature raised to 100° C.

Then, the vessel interior was cooled to 60° C. The reaction product thus obtained was diluted with water to a solid concentration of 94% by weight. Thereby, a curing agent with an active hydrogen equivalent of 255 was obtained.

COMPARATIVE EXAMPLE 2

In the same reaction vessel as in Example 1 was fed 544 g (4.0 mol) of metaxylylenediamine, and then a mixture of 183 g (0.163 mol) of polyethylene glycol diglycidyl ether (epoxy equivalent of 562, produced by Nagase Kasei Kogyo K.K., the trademark "Deconal EX-861), 456 g (1.2 mol) of epoxy resin in a liquid form of bisphenol A type (epoxy equivalent of 190, produced by Yuka Shell Epoxy Co., Ltd., the trademark "Epicoat 828"), 264 g (1.42 mol) of 2-ethylhexyl glycidyl ether (epoxy equivalent of 186, produced by NOF Corporation, the trademark "Epiol EH") and 380 g (2.88 mol) of butyl glycidyl ether was added dropwise thereto over one hour at 80° C. in an atmosphere of nitrogen under stirring. After the completion of the dropwise addition, the reaction was carried out for one hour at a reaction temperature raised to 100° C.

Then, the vessel interior was cooled to 60° C. The reaction product thus obtained was diluted with water to a solid concentration of 94% by weight. Thereby, a curing agent with an active hydrogen equivalent of 217 was obtained.

APPLICATION EXAMPLE 1

(Evaluation of Coating Film Formed by the Use of a Curing Agent)

134 g of the curing agent obtained in Example 1 was mixed with 100 g of epoxy resin in a liquid form of bisphenol A type (epoxy equivalent of 190, produced by Yuka Shell Epoxy Co., Ltd., the trademark "Epicoat 828") and then additional water was added to the mixture with stirring so that a solid concentration in the mixture became 70% by weight, thus preparing an aqueous epoxy resin composition in the form of emulsion. The aqueous epoxy resin composition thus prepared was applied onto a cold rolled steel sheet (70×150×0.8 mm) which had been treated with a #240 sand paper by the use of a 200 μm doctor blade and cured under the conditions of 23° C. and 50% RH for 7 days, thereby forming a coating film on the steel sheet.

The blending ratio of epoxy resin composition used and the evaluation result of coating film thus obtained are shown in Table 1.

APPLICATION EXAMPLE 2

The coating film was formed in the same manner as in Application Example 1 except that 119 g of the curing agent obtained in Example 2 was used instead of 134 g of the curing agent obtained in Example 1.

The blending ratio of epoxy resin composition used and the evaluation result of coating film thus obtained are shown in Table 1.

APPLICATION EXAMPLE 3

The coating film was formed in the same manner as in Application Example 1 except that 118 g of the curing agent obtained in Example 3 was used instead of 134 g of the curing agent obtained in Example 1.

The blending ratio of epoxy resin composition used and the evaluation result of coating film thus obtained are shown in Table 1.

APPLICATION EXAMPLE 4

The coating film was formed in the same manner as in Application Example 1 except that 134 g of the curing agent obtained in Comparative Example 1 was used instead of 134 g of the curing agent obtained in Example 1.

The blending ratio of epoxy resin composition used and the evaluation result of coating film thus obtained are shown in Table 1.

APPLICATION EXAMPLE 5

The coating film was formed in the same manner as in Application Example 1 except that 114 g of the curing agent obtained in Comparative Example 2 was used instead of 134 g of the curing agent obtained in Example 1.

The blending ratio of epoxy resin composition used and the evaluation result of coating film thus obtained are shown in Table 1.

In the present Application Examples, the following method and symbols were used to evaluate the cured coating film and represent the evaluation results.

(1) emulsifiability of curing agent

⊚: Very stable and homogeneous emulsification

○: Stable and almost homogeneous emulsification

Δ: Somewhat unstable emulsification or separation in a low concentration

X : Unstable emulsification or separation (2) Appearance of coating film (after 7 days of curing)

The evaluation result of appearance of cured coating film was expressed with the following symbols ⊚: Excellent ○: Good Δ: Fair X: Poor (3) Water resistance (after 7 days of immersion in water)

The evaluation result of water resistance was expressed with the following symbols.

⊚: Not changed at all

○: Initial appearance was almost maintained
Δ: Slightly changed
X: Changed

As can be seen from the above-mentioned Production Examples, Examples and Application Examples, the modified polyamine according to the present invention has a very low chlorine content and the aqueous epoxy resin curing agent being obtained from said modified polyamine can easily emulsify an epoxy resin and affords a cured product having excellent properties, particularly excellent water resistance.

Further, the epoxy resin curing agent causes no problem such as harmfulness to human body, hazard of fire or explosion and environmental pollution and can be very safely used since no solvent is employed.

TABLE 1

| Application Example | 1 | 2 | 3 | 4 | 5 |
|---|---|---|---|---|---|
| Blending ratio (part (s) by weight) | | | | | |
| Epicoat 828 | 100 | 100 | 100 | 100 | 100 |
| Curing agent in Example 1 | 134 | — | — | — | — |
| Curing agent in Example 2 | — | 119 | — | — | — |
| Curing agent in Example 3 | — | — | 118 | — | — |
| Curing agent in Comp. Ex. 1 | — | — | — | 134 | — |
| Curing agent in Comp. Ex. 2 | — | — | — | — | 114 |
| Additional water | 89 | 84 | 83 | 89 | 82 |
| Solid concentration (% by weight) | 70 | 70 | 70 | 70 | 70 |
| Total chlorine content of curing agent (ppm) | 60 | 40 | 40 | 1260 | 1250 |
| Evaluation results | | | | | |
| Emulsifiablilty | ⊚ | ⊚ | ⊚ | ⊚ | ○ |
| Appearance of coating film | ⊚ | ⊚ | ⊚ | ⊚ | ⊚ |
| Water resistance | ⊚ | ⊚ | ⊚ | Δ | X |

What is claimed is:

1. An aqueous epoxy resin curing agent which comprises a reaction product between a (a) modified polyamine comprising a reaction product between a polyamine selected from the group consisting of metaxylylenediamine, paraxylylenediamine, alicyclic polyamines and aromatic polyamines and a chlorohydrin synthesized by the reaction of a polyoxyalkylene polyether represented by the following formula (1):

RO—(XO)$_n$—H    (1)

wherein R represents a hydrogen atom or a hydrocarbon group having 1 to 20 carbon atoms, X represents an alkyl group having 2 to 4 carbon atoms and n is an integer of 1 to 30, with an epichlorohydrin, wherein the modified polyamine has a total chlorine content of 500 ppm or below, and at least one (b) hydrophobic epoxy compound having at least one epoxy group in the molecule, the reaction product between (a) modified polyamine and (b) hydrophobic epoxy compound being one obtained by conducting the reaction in a ratio of 0.2 to 0.5 equivalent of epoxy group to 1 mol of hydrogen atom bonded to nitrogen atom capable of reacting with epoxy group of the modified polyamine, said hydrophobic epoxy compound being at least one selected from the group consisting of glycidyl ethers of a monohydric or polyhydric alcohol, glycidyl ethers of a monohydric or polyhydric phenol and glycidyl ethers of a monohydric or polyhydric carboxylic acid, wherein said aqueous epoxy resin curing agent has a total chlorine content of 100 ppm or below.

2. A process for producing an aqueous epoxy resin curing agent which comprises reacting a (a) modified polyamine comprising a reaction product between a polyamine selected from the group consisting of metaxylylenediamine, paraxylylenediamine, alicyclic polyamines and aromatic polyamines and a chlorohydrin synthesized by the reaction of a polyoxyalkylene polyether represented by the following (1):

RO—(XO)$_n$—H    (1)

wherein R represents a hydrogen atom or a hydrocarbon group having 1 to 20 carbon atoms, X represents an alkyl group having 2 to 4 carbon atoms and n is an integer of 1 to 30, with an epichlorohydrin, wherein the modified polyamine has a total chlorine content of 500 ppm or below, with at least one (b) hydrophobic epoxy compound having at least one epoxy group in the molecule, the reaction product between (a) modified polyamine and (b) hydrophobic epoxy compound being one obtained by conducting the reaction in a ratio of 0.2 to 0.5 equivalent of epoxy group to 1 mol of hydrogen atom bonded to nitrogen atom capable of reacting with epoxy group of the modified polyamine, said hydrophobic epoxy compound being at least one selected from the group consisting of glycidyl ethers of a monohydric or polyhydric alcohol, glycidyl ethers of a monohydric or polyhydric phenol and glycidyl ethers of a monohydric or polyhydric carboxylic acid, thereby producing an aqueous epoxy resin curing agent having a total chlorine content of 100 ppm or below.

* * * * *